United States Patent
Kumaran et al.

(10) Patent No.: US 7,283,552 B2
(45) Date of Patent: Oct. 16, 2007

(54) METHOD OF SCHEDULING BURSTS OF DATA FOR TRANSMISSION IN A COMMUNICATION NETWORK

(75) Inventors: Krishnan Kumaran, Scotch Plains, NJ (US); Kevin Ross, Menlo Park, CA (US); Iraj Saniee, New Providence, NJ (US); Indra Widjaja, Florham Park, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 970 days.

(21) Appl. No.: 10/426,389

(22) Filed: Apr. 30, 2003

(65) Prior Publication Data

US 2004/0218622 A1    Nov. 4, 2004

(51) Int. Cl.
 *H04B 7/212* (2006.01)
 *H04L 12/43* (2006.01)
(52) U.S. Cl. .................... 370/444; 370/461
(58) Field of Classification Search ........... 370/443, 370/461, 462, 444; 398/68
 See application file for complete search history.

(56) References Cited

U.S. PATENT DOCUMENTS

2002/0001294 A1* 1/2002 Amouris ................ 370/337
2003/0058826 A1* 3/2003 Shearer, III ............ 370/338

FOREIGN PATENT DOCUMENTS

WO    WO 02/071791 A2    9/2002

OTHER PUBLICATIONS

Wen, B., et al., "Routing, Wavelength and Time-Slot Assignment in Time Division Multiplexed Wavelength-Routed Optical WDM Networks," IEEE Infocom, pp. 1442-1450, 2002.
Elek, V., et al., "Photonic Slot Routing: A Cost-Effective Approach to Designing All-Optical Access and Metro Networks," IEEE Communications Magazine, pp. 164-171, Nov. 2001.
EPC Search Report dated Jul. 21, 2004.

* cited by examiner

*Primary Examiner*—Doris H. To
*Assistant Examiner*—Kerri M. Rose (57) ABSTRACT

A method for scheduling data bursts from origin to destination nodes of a communication system involves selecting a yet-unscheduled, feasible node pair for scheduling of a burst therebetween; selecting a timeslot from a finite timeslot sequence; scheduling the burst for the selected timeslot; and repeating the preceding steps to exhaustion of unscheduled demand or of feasible node pairs. The feasibility of a node pair is conditioned on the avoidance of collisions with already-scheduled bursts, taking the various origin-to-destination propagation delays into account.

7 Claims, 6 Drawing Sheets

METHOD OF SCHEDULING BURSTS OF DATA FOR TRANSMISSION IN A COMMUNICATION NETWORK

CROSS-REFERENCE TO RELATED PATENT APPLICATIONS

U.S. patent application Ser. No. 10/411,039, filed Apr. 10, 2003 by R. C. Giles et al. under the title, "Optical Network With Subwavelength Grooming," commonly assigned herewith, discloses certain subject matter which is common hereto.

U.S. patent application Ser. No. 10/426,388, filed Apr. 30, 2003 by R. C. Giles et al. under the title "System and Method for WDM Communication with Interleaving of Optical Signals for Efficient Wavelength Utilization," commonly assigned herewith, discloses certain subject matter which is common hereto.

FIELD OF THE INVENTION

The invention relates to the scheduling of bursts, i.e., of limited-length data sequences, in a communication network. Burst transmission has applications, inter alia, in WDM optical networks.

ART BACKGROUND

A "burst" as referred to herein is a data sequence of limited length. Although this term is most familiar in the field of optical networks, the term as used herein also includes short data sequences for transmission from a source to a destination in, e.g., a time-division multiplexed wireless network or a wireline packetized network.

Optical burst-mode transmission has been proposed as a way to increase the efficiency with which wavelength channels are used in all-optical WDM networks. For example, U.S. patent application Ser. No. 10/411,039, "Optical Network Wit Subwavelength Grooming," cited above, describes a WDM ring network, and U.S. patent application Ser, No. 10/426,388, "System and Method for WDM Communication with Interleaving of Optical Signals for Efficient Wavelength Utilization," also cited above, describes a WDM mesh network, both suitable for burst-mode transmission.

One important feature of the networks described in the above-cited patent applications is that passive wavelength-selective components can be used to assure that the receiver at each destination receives only those bursts that lie in a wavelength channel dedicated to that destination. On the other hand, an originating node can generally send out bursts in any of various wavelength channels, each corresponding to a particular intended destination.

In such a network, as well as in wireless and wireline networks posing analogous problems, it is desirable to schedule the bursts so that bursts from different origins do not collide; i.e., so that they do not arrive concurrently at a common destination. When propagation delays between origin and destination node pairs are insignificant, well-known algorithms can be used to generate schedules that reliably make efficient use of the available wavelength channels and timeslots.

However, the problem becomes much more difficult when delays must be taken into account. Until now, there has lacked an efficient scheduling algorithm that takes into account the various propagation delays between node pairs.

SUMMARY OF THE INVENTION

We have found a scheduling algorithm that efficiently schedules bursts while avoiding collisions. Importantly, our new algorithm takes delay into account.

Accordingly, burst scheduling according to our invention involves selecting a yet-unscheduled, feasible node pair for scheduling of a burst therebetween; selecting a timeslot from a finite timeslot sequence; scheduling the burst for the selected timeslot; and repeating the preceding steps to exhaustion of unscheduled demand or of feasible node pairs.

A yet-unscheduled node pair is considered to be feasible in a given timeslot only if the burst will neither start concurrently with an already-scheduled burst at the origin node nor, taking delay into account, arrive concurrently with an already-scheduled burst at the destination node. In other words, the node pair is feasible for scheduling if the burst to be scheduled will not collide with an already-scheduled burst.

In specific embodiments of the invention, each node pair to be selected for scheduling, and each timeslot to be selected for such node pair, are chosen preferentially according to a weight function. The weight function is proportional, for a given node pair in a given timeslot, to unscheduled demand between the given node pair and normalized by a sum of unscheduled demands between node pairs belonging to a particular set. The set over which the sum is taken is a set of feasible node-pair-timeslot combinations that potentially collide with the given node pair.

DETAILED DESCRIPTION

Figure 1:
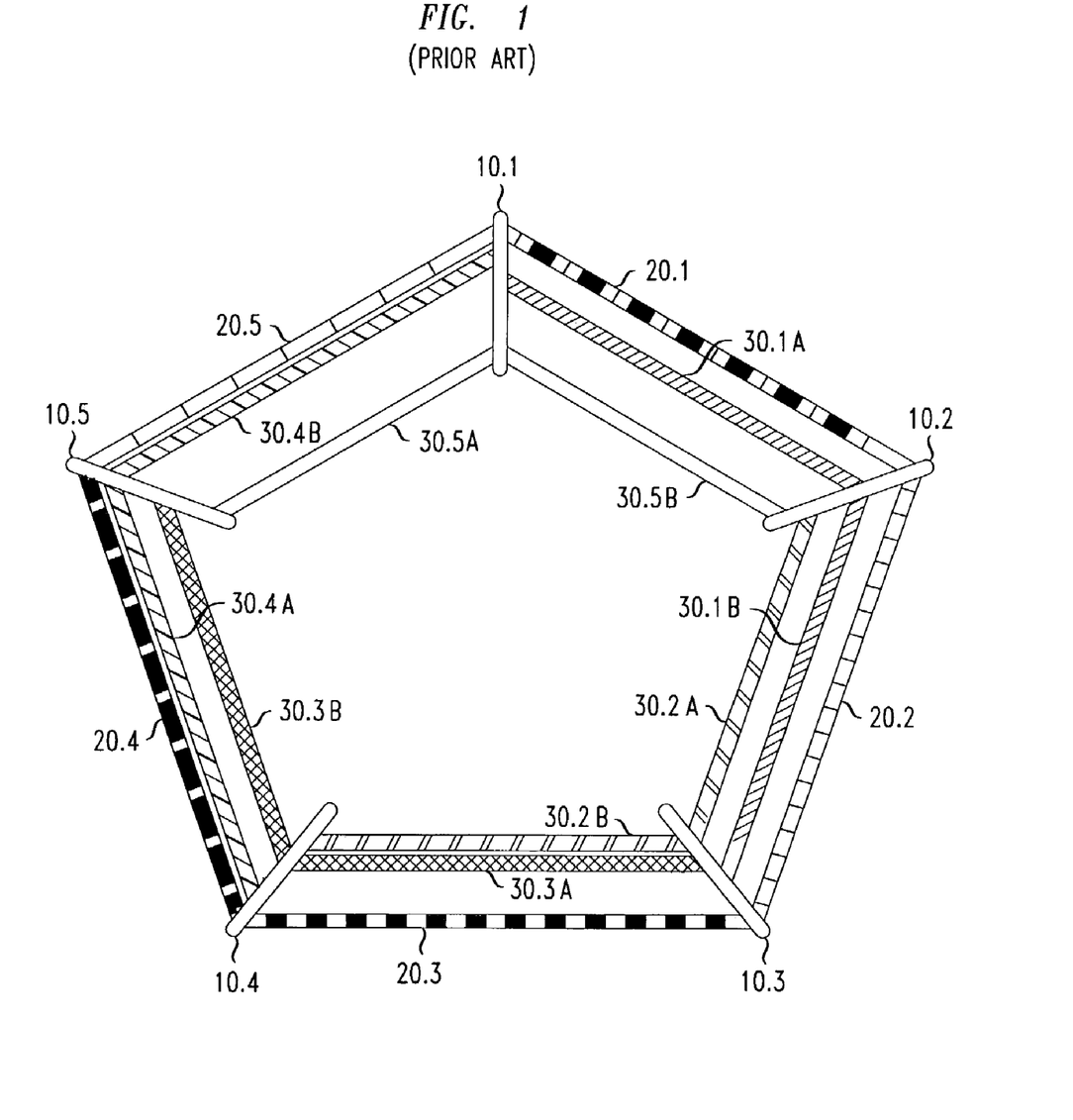
FIG. 1 is a conceptual drawing of a WDM ring network of the prior art.

FIG. 1 schematically depicts a so-called "one-on-one" optical WDM ring network, in which one full wavelength channel is dedicated to each origin-destination node pair and ten lasers are required. For pedagogical purposes, the ring depicted has been limited to only five nodes 10.1-10.5, interconnected by five bidirectional links. Each link has been depicted as subdivided into three sublinks, each corresponding to one full wavelength channel on the link. In the figure, the shading of each sublink indicates the corresponding wavelength channel.

Thus, sublink 20.1 connects node 10.1 to node 10.2, and each of sublinks 20.2-20.5 similarly connects one adjacent pair of nodes. Sublinks 30.1A and 30.1B correspond to the same wavelength channel and connect node 10.1 to node 10.3. Similarly, each sublink pair 30.2A/30.2B to 30.5A/

30.5B corresponds to a single wavelength channel and connects one pair of non-adjacent nodes.

Although useful, an arrangement such as that depicted in FIG. 1 has certain inefficiencies because a full wavelength channel must be assigned to every origin-destination pair, including those whose demands never add up to more than a small fraction of the capacity of the assigned channel. As a consequence, the cost of the network is driven up by underutilized components, such as light sources, e.g., lasers, and optical add-drop elements, that support the underutilized wavelength channels. Although greater efficiency can be achieved by reusing wavelengths, exemplarily by applying electrical-grooming techniques, these techniques generally require conversion from the optical to the electrical domain and back, at least at some nodes, which adds to the equipment costs.

Figure 2:
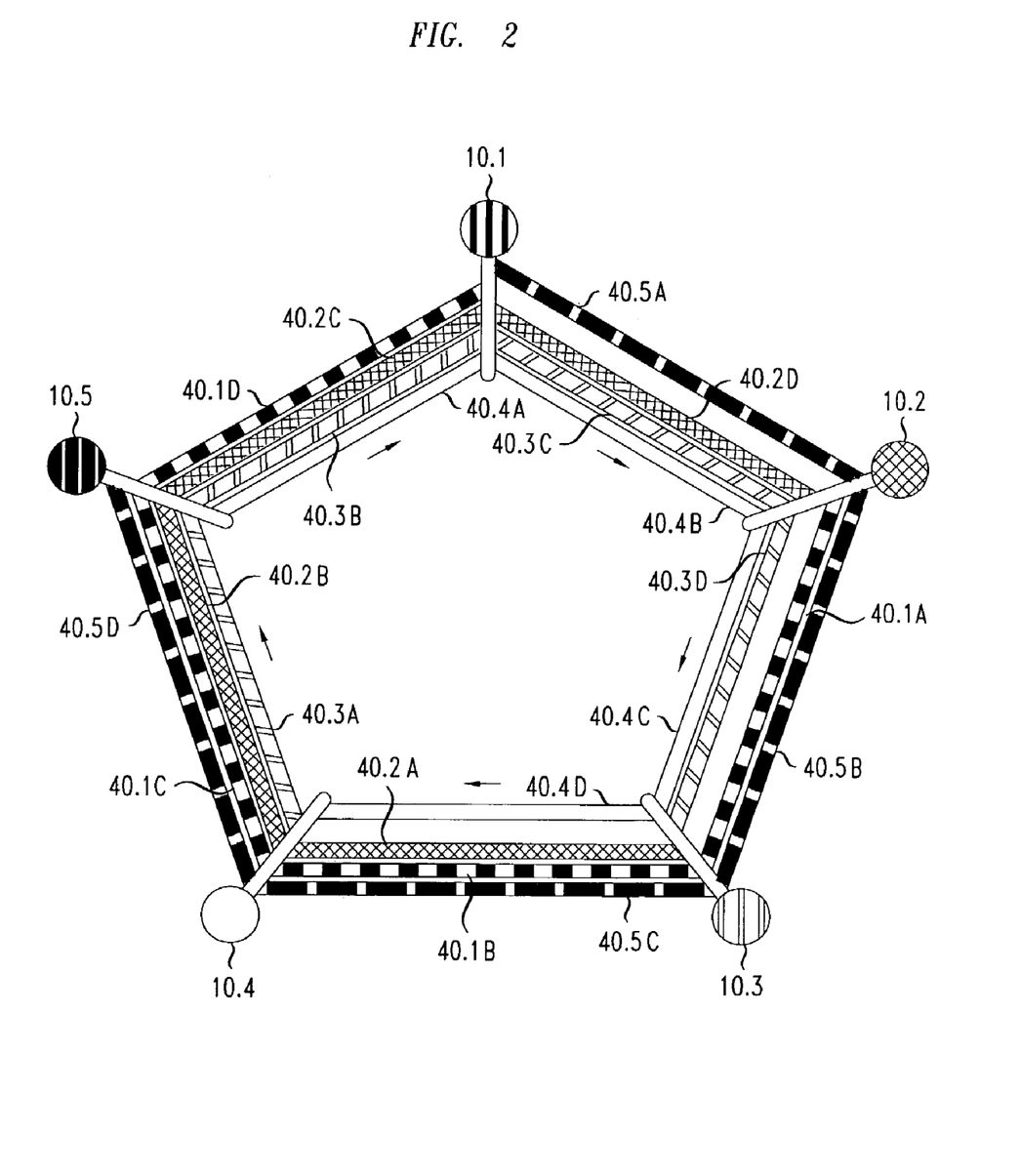
FIG. 2 is a conceptual drawing of a WDM ring network in which the herein-described scheduling method may be useful.

By contrast, FIG. 2 depicts a similar ring in which a scheme we refer to as Time-Domain Interleaved Networking (TWIN) can be implemented. Importantly, TWIN has applications not only in ring networks, but also in mesh networks generally. In TWIN, a specific wavelength channel or set of wavelength channels is assigned to each destination node. Origin nodes transmit intermittently through, e.g., tunable lasers to each of various destination nodes. Each transmission to a given destination node is made in one assigned wavelength channel regardless of the node at which the transmission originated. Thus, routing is determined by the wavelength assignments and by a pre-assigned graph for each assigned wavelength, referred to as a "tree," which specifies the sequence of links to be traversed from each origin node to the destination node assigned to that wavelength. The trees, in turn, are advantageously implemented by wavelength-selective cross-connects (WSCCs). The bursts are scheduled in such a way as to prevent bursts from disparate origins from colliding at a common destination. In TWIN, the optical bursts are passively transported across the network, in the sense that the routing is achieved through inherent physical properties of the bursts themselves, without any change in state of the hardware elements responsible for the routing.

The nodes in FIG. 2 have been given the same reference numerals as in the previous figure. In contrast to the bidirectional links of FIG. 1, the links of FIG. 2 are shown for simplicity as unidirectional links. As depicted in the figure, each link is subdivided into four sublinks, each shaded to indicate a corresponding wavelength channel. Each destination node is associated with one of the wavelength channels, as also indicated by shading in the figure.

As shown in the figure, all transmissions to node 10.1 use part or all of the path consisting of sublinks 40.1A-40.1D. Similarly, transmissions to node 10.2 use sublinks 40.2A-D; to node 10.3, sublinks 40.3A-D; to node 10.4, sublinks 40.4A-D; and to node 10.5, sublinks 40.5A-D.

Upon inspection of FIG. 1, it will be apparent that the total number of wavelength channels used in the ring depicted there is ten: five for connecting adjacent nodes, and five for connecting non-adjacent nodes. If fixed wavelength lasers are used as light sources at the nodes, twenty such lasers are needed; i.e., ten in each direction. By contrast, the ring of FIG. 2 uses only five wavelength channels: one for each destination node. Five tuneable lasers will suffice as light sources for the ring of FIG. 2.

Figure 3:
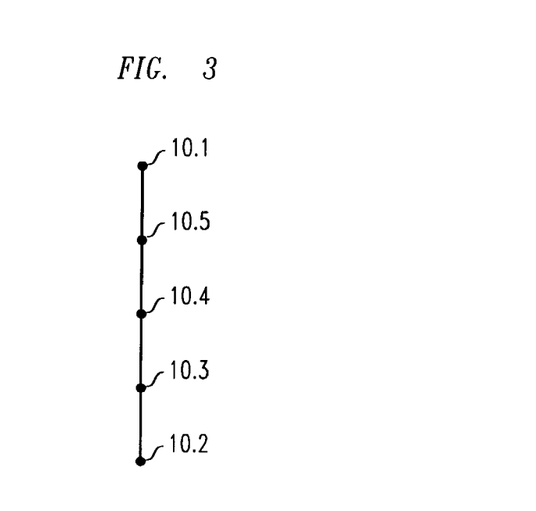
FIG. 3 is a tree graph corresponding to node 10.1 of FIG. 2.

FIG. 3 represents the tree for node 10.1 of FIG. 2. The destination, i.e. node 10.1, is situated at the root of the tree, which is here represented at the top of the figure. Transmissions from each of the other nodes to node 10.1 proceed upward (as seen in the figure) through the sequence of nodes (and of course through the sequence of interconnecting links) shown in the figure. There is a similar tree for each of the other nodes.

Figure 4:
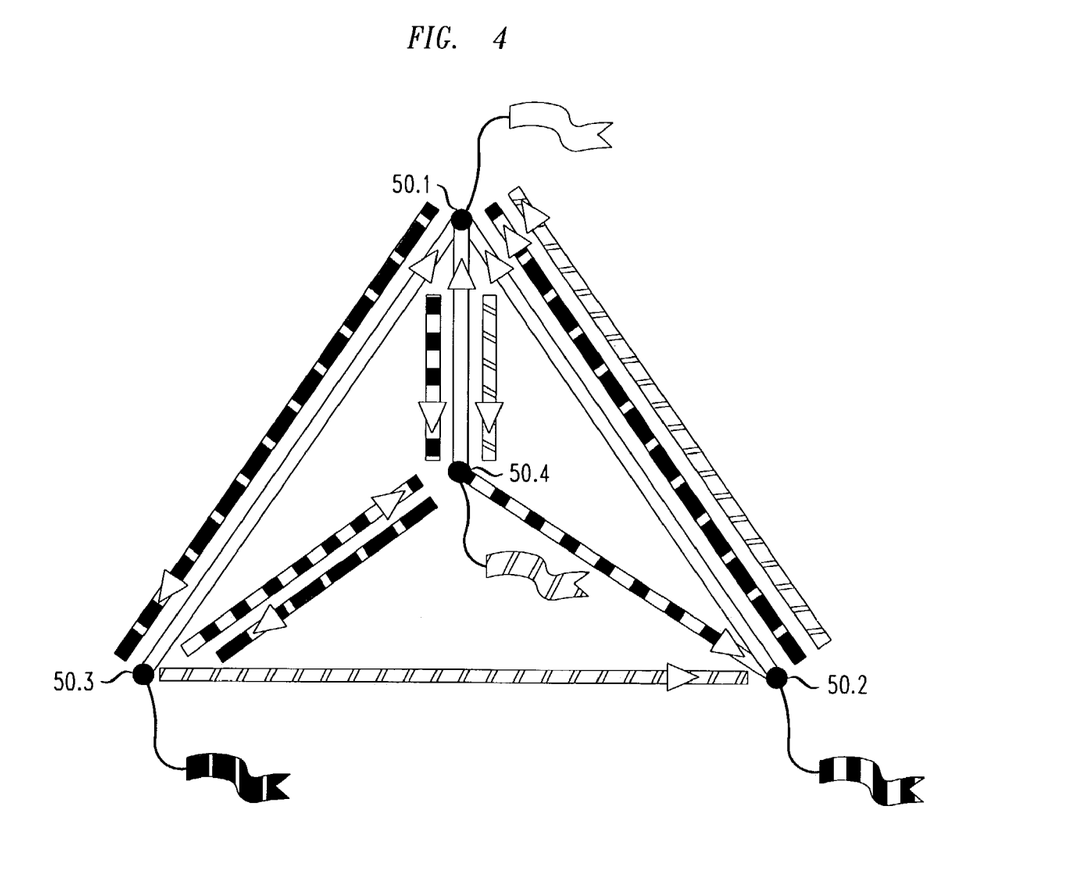
FIG. 4 is a conceptual drawing of a WDM mesh network configured according to an exemplary implementation of TWIN.

As noted above, TWIN is not limited to ring networks, but instead applies to optical networks generally. By way of further illustration, FIG. 4 depicts a simplified optical mesh network that is not a ring network. As seen in the figure, the network depicted there has three nodes 50.1-50.3 situated, for purposes of illustration, at the vertices of a triangle, and a fourth node 50.4 situated at the center of the triangle. In accordance with basic concepts of TWIN, each of the four nodes has an assigned wavelength channel, indicated in the figure by the shading of a pennant shown as tethered to the pertinent node.

A routing scheme for the network of FIG. 4 has been devised which is intended solely to be illustrative of various possible destination-based tree graphs. It was devised without regard to any considerations of optimality or, indeed, of practicality. The routing scheme is indicated in the figure by the subdivision of each link into one, two, or three sublinks, each shaded to correspond to a wavelength channel.

Figure 5A:
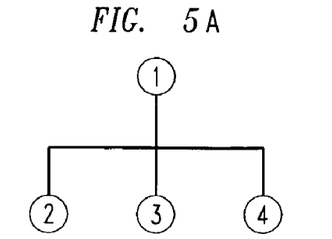
FIGS. 5A-5D are tree graphs corresponding to respective nodes of FIG. 4.
Figure 5B:
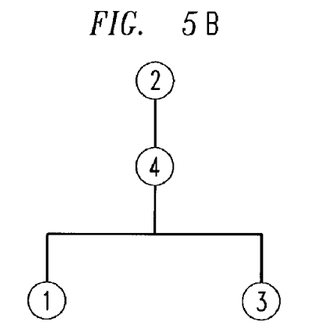
Figure 5C:
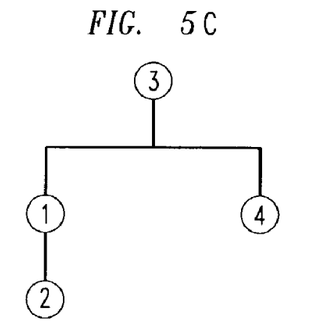
Figure 5D:
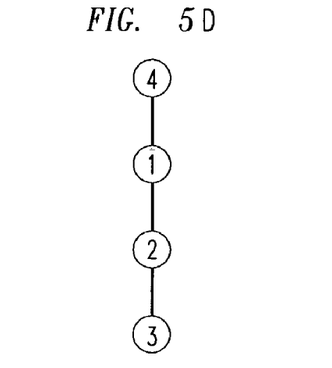

Upon inspection of the figure, it will be seen that each of nodes 50.2-50.4 transmits directly to node 50.1. This arrangement is diagrammed in the tree of FIG. 5A. Upon further inspection of FIG. 4, it will be seen that node 50.4 transmits directly to node 50.2, but each of nodes 50.1 and 50.3 transmits to node 50.2 only through node 50.4. This arrangement is diagrammed in the tree of FIG. 5B. Upon yet further inspection of FIG. 4, it will be seen that each of nodes 50.1 and 50.4 transmits directly to node 50.3, but node 50.2 transmits to node 50.3 only via node 50.1. This arrangement is diagrammed in the tree of FIG. 5C. Turning to FIG. 4 one last time, it will be seen that nodes 10.1-10.3 transmit to node 10.4 according to the sequence 10.3 to 10.2 to 10.1 to 10.4. This arrangement is diagrammed in FIG. 5D.

In general, many different trees will be possible for each destination node of a given network. Various algorithms are available to aid the network designer in choosing appropriate trees. In particular, algorithms are available that will readily identify the minimum spanning tree or a shortest path tree for any given destination node of any given network. The trees may also be designed with redundancy to take into account of possible network failures.

As noted above, it is advantageous to implement the trees by installing wavelength selective cross connects (WSCCs) at some or all of the nodes to allow reconfiguration. It is also advantageous for these WSCCs to perform the further function of merging common input wavelengths onto a common output fiber. Significant cost advantages are achieved if the WSCCs are implemented using 1×K wavelength-selective switches.

Details of an illustrative optical mesh network may be found in the above-cited U.S. patent application Ser. No. 10/426,388, "System and Method for WDM Communication with Interleaving of Optical Signals for Efficient Wavelength Utilization," which is hereby incorporated herein by reference.

Figure 6:
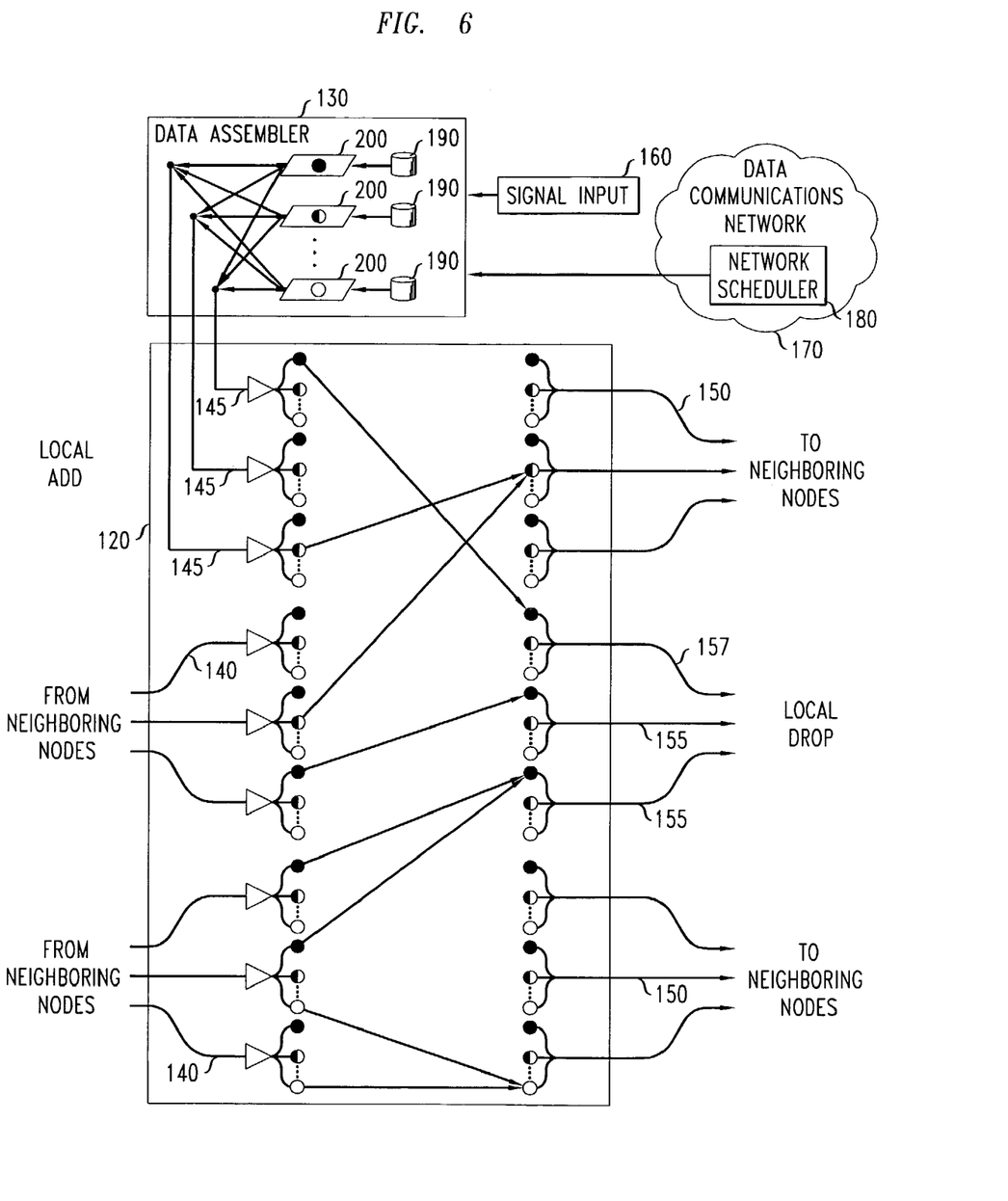
FIG. 6 is a schematic, functional diagram of a node of an illustrative WDM mesh network configured according to an exemplary implementation of TWIN.

FIG. 6 is a schematic, functional diagram of a node including Wavelength-Selective Cross-Connect (WSCC) 120 and data assembler 130. The function of the data assembler is to convert an input signal stream from signal source 160, which typically provides signal input in the electrical domain, to appropriately timed sequences of optical bursts distributed over multiple wavelength channels according to the respective destinations, and in at least some cases distributed over local input fibers 145 to WSCC 120. It should be noted by way of example but without limitation, that the signal input from source 160 may have a synchronous or an asynchronous format. Exemplary synchronous formats are DS-1, STS-1, and STS-3. Exemplary asynchronous formats are IP, ATM, FR, Ethernet, and SANs.

In the figure, data assembler 130 has been shown as including a respective buffer 190 for each of the wavelength channels. In the figure, three illustrative wavelengths are denoted, respectively, by a filled circle, a half-filled circle, and an open circle. Each buffer 190 is shown as providing signal input to a respective laser transmitter 200. The output of each laser transmitter 200, in turn, is shown as optically coupled to the local input fibers 145 of the WSCC.

For purposes of illustration, WSCC 120 is shown as having three local input fibers 145, and six input fibers 140 from neighboring nodes. Also for purposes of illustration, WSCC is shown as having six output fibers 150 to neighboring nodes, and three local drop fibers 155, 157.

The signal light sources are preferably fast-tunable lasers, so that the total number of laser transmitters can be significantly reduced. (A laser is considered "fast-tunable" in this context if it has a switching time less than 100 ns.) For example, the three fixed lasers 200 can be replaced with only one fast-tunable laser. Fast-tunable lasers useful in the context of the present invention and capable of switching from one wavelength to another in sub-nanoseconds are commercially available.

In at least some embodiments of the invention, it will be advantageous to distribute timing information, and other control information, to the nodes over a separate network 170, which is here referred to as the Data Communications Network (DCN). One component that makes use of DCN 170 is network scheduler 180. The function of the network scheduler is to assign timeslots for the optical bursts in each wavelength channel from each source node. The timing must be arranged so as to avoid collisions; i.e., to prevent bursts from distinct sources but in a common wavelength channel from overlapping on arrival at the destination node.

As will be seen, the complexity of collision-avoidance is reduced significantly by using tree graphs as described above. In particular, the use of trees ensures that if no collision occurs at the destination, no collision will occur at any prior point. This follows from the fact that if two bursts do collide at an intermediate node, they will thereafter coincide all the way to the destination.

Generally, the network scheduler will take into account the delay times between each of the source-destination node pairs. One useful approach to solving the timing problem is described below.

Turning again to WSCC 120, it will be noted that as drawn in the figure, each input fiber and output fiber of the WSCC fans out within the WSCC to an array of wavelength symbols, three of which appear explicitly as a filled, a half-filled, and an open circle as described above. Each of these symbols represents a wavelength that can be connected across the WSCC from an input fiber to an output fiber. A few illustrative cross connections are represented in the figure by arrows, each of which extends from an input-side wavelength symbol to a matching output-side wavelength symbol. These cross connections will typically be reprogrammable, on a relatively long timescale characteristic of network maintenance operations, in response to signals sent over DCN 170.

The merging function is achieved by directing incoming signals of a given common wavelength to a common output port. Typically, such signals will be output on a common outgoing fiber.

The node represented in the figure is the node whose assigned wavelength channel is symbolized by a filled circle. For that reason, the figure shows four incoming signals in that channel being connected to "local drop" output fibers. It will be noted that the signal directed to output fiber 157 is a locally generated signal. Such a signal may be used for control, rather than for communication, purposes.

At each source node, an aggregation function may be carried out within data assembler 130. That is, the incoming traffic flows enter in the form of IP packets, ATM cells, MLPS frames, or the like. These units of information from a given client are here referred to generically as "client Protocol Data Units (PDUs)." A group of PDUs for a given destination, from multiple clients, may be aggregated into a single optical burst. At the destination node, after the received optical signal is demodulated, each such burst must be decapsulated into the individual client PDUs for forwarding to the respective clients' ports. It should be noted in this regard that separate aggregation functions may be needed for synchronous and asynchronous signals, respectively.

Not shown in FIG. 6 is a receiver for detecting the locally dropped optical signals. At each node, such a receiver will be required to detect bursts arriving from various transmitters that are clocked asynchronously, and to perform frequency and phase synchronization on a burst-by-burst basis so that receipt of signals on different wavelengths can be distinguished and time-separated. Receivers suitable for this purpose are known, and are referred to in the art as "burst-mode receivers." Such a receiver is described, for example, in S. Rubin et al., "Implementation of ultrafast widely-tunable burst-mode 10 Gbit/s transceiver," Electronics Letters 38 (November 2002) 1462-1463.

One useful way to facilitate synchronization is via a preamble field that is prepended to each optical burst. This enables a synchronizer in the receiver to lock to the transmitter's bit stream for each burst. A start-of-burst delimiter field, which is also prepended to the optical burst, will be effective for delineating the burst, once bit synchronization has been achieved.

A practical lower limit to the length of a burst is imposed by the lack of a common timing between different nodes. In preferred embodiments, each node derives its time-of-day timing from a GPS, which will typically have uncertainty of 100 ns or less. To allow for such uncertainty, two adjacent bursts will generally be separated by a guard time interval of the same order as the uncertainty. The length of a burst, then, should be much longer than the guard time interval to achieve good efficiency. On the other hand, the length of a burst should not be so long that the packetization delay is increased significantly. We have found that burst lengths in the range of several to tens of microseconds provide a good tradeoff using currently available technology.

By way of example, the format for the optical bursts may advantageously conform, with some modification, to the GFP specification described in the standards document *ITU-T Rec. G.*7041, "Generic Framing Procedure (GFP)," December 2001. One useful modification will be to extend the GFP payload length field, so that a longer payload can be accommodated. Another useful modification will be to add a PDU length field, so that each client PDU can be delineated within the payload. Yet another useful modification will be to add a preamble and a start-of-burst delimiter.

In an exemplary scheme for organizing the transmissions of optical bursts, each burst is carried by one timeslot. Accordingly, the total duration of one timeslot is the sum of the payload duration, a guard time, and an overhead duration. Typical timeslot durations are 2-20 microseconds are suitable when the optical channel rate is 10 Gbps and the stream of the smallest granularity is roughly 50 Mbps. A number of timeslots, typically 150-200, are packed into a repetitive cycle.

The scheduling function operates to assign slots to origin-destination pairs such that collisions are avoided, slot utilization is maximized, and preferable, at least some minimum transmission rate is assured for each origin-destination pair. In exemplary embodiments of the invention, a distributed scheduler (DS) supports asynchronous traffic, and a centralized scheduler (CS) supports synchronous traffic. To avoid contention by the DS and CS for the same slots, each cycle is advantageously subdivided into two periods—one for transmission of each class of traffic.

Advantageously, each DS is associated with a given destination and performs scheduling among those origin nodes that have information to be sent to that destination. The DS examines a bandwidth request sent by a source and in response grants selected slots in subsequent cycles. The request and grant messages are transmitted in-band, i.e., in the same optical channel as the data channel rather than over the DCN, so that this information is exchanged quickly enough to accommodate changes in the requests.

The CS schedules the burst transmission of synchronous traffic in which the client PDUs arrive periodically, and for which the bandwidth of a connection is relatively constant. Accordingly, the CS can gather and process the pertinent information, such as the traffic demand matrix, over a relatively long time scale, e.g. on the order of seconds. Consequently, the CS can run a very effective algorithm for computing desirable slot allocations for the origin-destination pairs. One such algorithm is described below. Significantly, the scheduler must take into consideration the propagation delays between the various node pairs.

A scheduling algorithm of current interest is based on a relationship between the problem of avoiding collisions between bursts and the graph-theoretical concept of independent sets. In graph theory, an independent set of vertices contains no neighboring pair of vertices; i.e., no pair of vertices connected by one edge. Graph theory is applied to the scheduling problem by assigning a vertex (i, j) to every possible transmission, in a given timeslot, from some node i to some node j.

Two vertices (i, j), (i', j') of the resulting graph are neighbors if they satisfy a neighborhood condition. If transmission is instantaneous, or if the transmission delays $d_{ij}$ from node i to node j are equal for all i and j, then the neighborhood condition is satisfied if i=i' or if j=j'. (Unless stated otherwise, "or" is inclusive.)

Equality of i and j is treated as a forbidden collision because each origin node may transmit to no more than one destination node per timeslot. Equality of j and j' (for i≠i') implies a collision in the sense that transmissions from distinct origins arrive at a common destination in the same timeslot.

If $d_{ij}$ differs for different (i, j), the neighborhood condition is more complicated. We introduce a timeslot index k, k=1, . . . , T, wherein T is large enough to schedule most or all of the currently specified traffic demands $W_{ij}$. If a transmission from i to j is initiated in timeslot k, the corresponding vertex is now indexed (i, j, k).

For i≠i', vertices (i, j, k) and (i', j', k') now satisfy the neighborhood condition if they have a common destination (j=j') and the burst sent from i in timeslot k arrives at j concurrently with the burst sent from i' in timeslot k' ($k+d_{ij}=k'+d_{i'j}$). As explained above, a pair of vertices will also satisfy the neighborhood condition if they have a common origin (i=i') and common initial timeslot (k=k').

For purposes of the algorithm to be described below, we also introduce a vertex property that we refer to as feasibility. A vertex (i, j, k) is feasible if no burst has yet been scheduled for transmission from node i in timeslot k, or no burst destined for node j has yet been scheduled so as to arrive in timeslot $k+d_{ij}$. The second alternative condition means that no transmission (i', j, k') has been scheduled for which $k'=k+d_{ij}-d_{i'j}$.

Thus, the feasibility indicator for node pair (i, j) at time k takes unity value if a burst can be scheduled in timeslot k without fear of a prohibited collision. Otherwise, the feasibility indicator takes zero value. The feasibility indicator is used to substantially prevent prohibited collisions. In this context, "substantial prevention" means prevention of all collisions, except those that occur due to inaccuracies in timing or in the measurement of delays.

It will be understood that in adding delays to timeslot indices, each delay $d_{ij}$ is rounded to the next higher full timeslot unit.

An independent set of transmissions can be sent in concert within a single timeslot because, by definition, independent transmissions will not collide at the origin or at the destination. The algorithm to be described seeks a tradeoff between two desirable goals: to find, for each successive timeslot, the largest possible independent set of the yet-unscheduled demands, and to favor those node pairs between which there remain the greatest unscheduled demands.

To achieve the desired tradeoff, the algorithm refers to a quantity that we here denote the Normalized Weight (NW). The NW of a node pair (i, j) at time k is the unscheduled demand $D_{ij}$ between that pair, divided by a sum of unscheduled demands for node pairs in the neighborhood at time k of node pair (i, j).

Importantly, this summation is carried out over time as well as over node pairs. Thus, at each timeslot k', those and only those node pairs (i', j') are counted which are neighbors of (i, j) and for which (as a further, not an alternative requirement) the vertex (i', j', k') satisfies the feasibility condition. (In this regard, (i, j) is considered a member of its own neighborhood.)

The NW is represented by the following equation:

$$NW_{ij}(k) = \frac{f_{ij}(k) \cdot D_{ij}}{\sum_{i'j'k'} D_{i'j'} \cdot f_{i'j'}(k')},$$

where the summation is carried out only over vertices in the neighborhood of (i, j, k), and $f_{i'j'}(k')$ equals 1 if (i', j', k') is feasible, zero otherwise.

Figure 7:
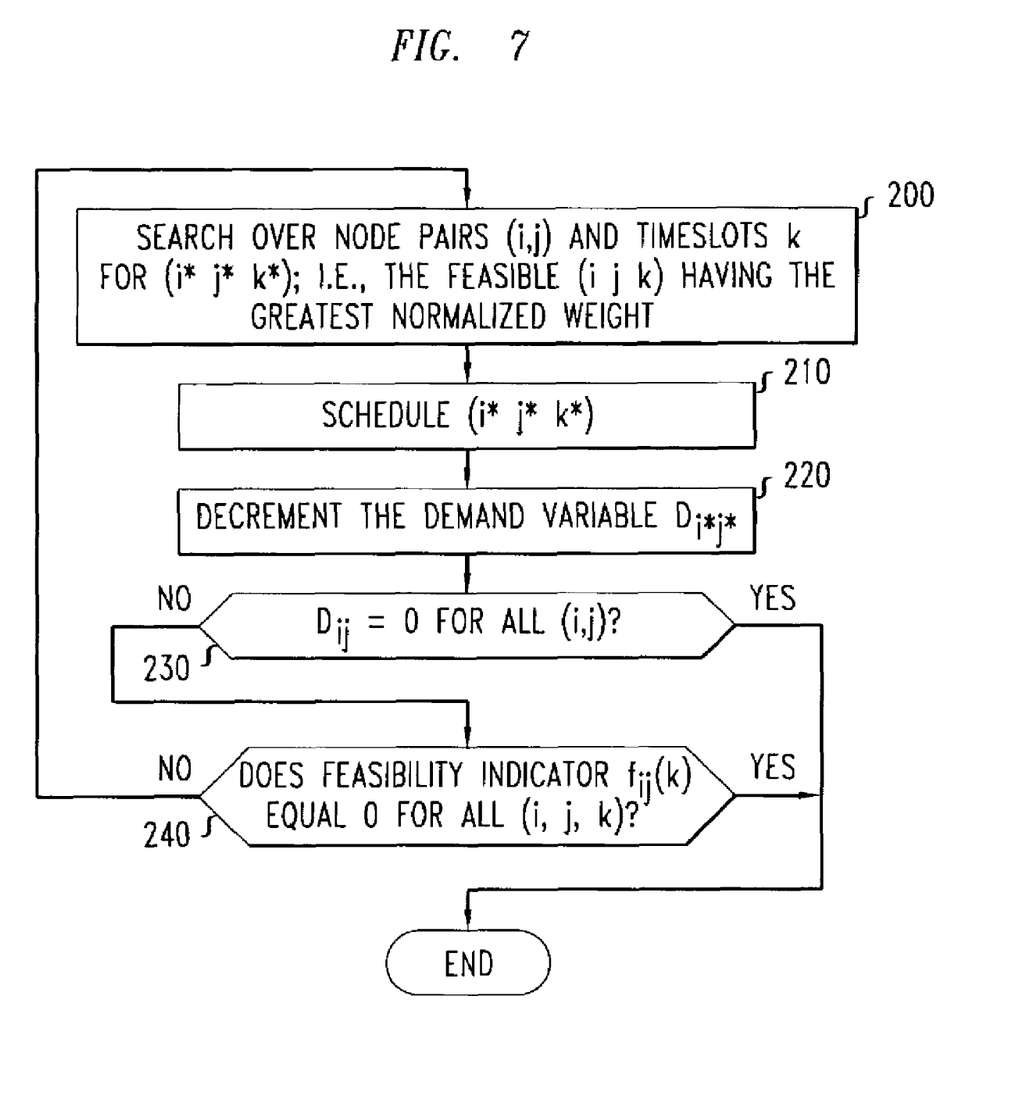
FIG. 7 is a flowchart illustrative of the present invention in one embodiment.

Turning to FIG. 7, in accordance with our scheduling algorithm, we first seek, for k∈{1, . . . , T}, that feasible vertex (i*, j*, k*) having the greatest NW. (FIG. 7, block 200.) We schedule (i*, j*, k*) (block 210) and decrement $D_{i*j*}$ by one unit (block 220). We repeat the same procedure until all demands have been scheduled (block 230) or until none of the remaining vertices are feasible (block 240).

In a practical network, it is advantageous to include a protection scheme for maintaining connections between node pairs in the face of link failures or other faults. We have devised a protection scheme, to be described below, that is simple to implement. It would be expected that implementation of a protection scheme would detract somewhat from network performance. However, numerical simulations based on realistic traffic modeling have shown that the performance penalty associated with our scheme is relatively small, in general.

In accordance with our protection scheme, every node pair is assigned two paths, a primary path to be used in normal operation, and a backup path to switch to when a failure is detected. The set of backup paths to each destination node will constitute a backup tree associated with that node. Although the present discussion assumes that protection is afforded to all node pairs, it will be appreciated that similar arguments apply when only a subset of the node pairs are to be protected.

As with the primary trees, any of various known algorithms are readily used to generate the backup trees. In general, it will be most advantageous to make each backup path disjoint from the corresponding primary path, so that, at least for simple faults, only one of the two paths can fail at a time.

The scheduling algorithm, such as the one described above, is performed so as to schedule for both the primary and the backup paths. This is achieved by replacing each node pair (i, j) with two node pairs $(i^p, j^p)$ and $(i^b, j^b)$, each having a respective delay $\delta_{ij}^p$, $\delta_{ij}^b$. (Typically, the primary delay will be the smaller delay.)

In performing the scheduling algorithm, the prohibitions against collisions apply to the backup node pairs in the same manner as to the primary node pairs. However, these prohibitions are not applied between a primary path and its corresponding backup path.

In normal network operation, all demand will be carried on primary paths, and thus there will be zero demand to be scheduled between backup node pairs. When affected node pairs detect a failure, all demand between those pairs will be switched to the backup paths, and scheduled accordingly.

The above scheduling algorithm has been described in the context of a WDM optical network. Importantly, the same and similar algorithms also have applications to networks, and indeed to communication media, of other kinds. For example, bursts in a wireless network can be scheduled as described above, and directed to their respective destinations according, e.g., to rf frequency band or CDMA code. In a packetized network, bursts packaged with header information can likewise be scheduled as described above, and routed to their respective destinations according to information contained in their respective headers.

What is claimed is:

1. A method for scheduling bursts, which carry a quantity of traffic between an origin node and a destination node forming a node pair of a communication network, the method comprising the steps of:

a) determining one or more yet-unselected feasible node pairs for timeslots of a finite timeslot sequence, a node pair being feasible in a given timeslot if a burst will neither start concurrently at the origin node with an already-scheduled burst nor, taking delay into account, arrive concurrently at the destination node with an already-scheduled burst;

b) selecting a timeslot from said finite timeslot sequence;

c) selecting one of said yet-unselected feasible node pairs determined for said selected timeslot;

d) scheduling the burst for said selected timeslot and feasible node pair; and e) repeating steps a) to d) until exhaustion of unscheduled demand or of feasible node pairs;

wherein a weight is defined as a function of a node pair and a timeslot, and priority is given in step c) to node pair timeslot combinations for which the weight is greatest, the weight of a given node pair timeslot combination increasing with the amount of unscheduled demand between the node pair in the timeslot and varying inversely with a sum of unscheduled demands, said sum being taken over those node pair timeslot combinations that would be rendered unfeasible if the given node pair were scheduled in the given timeslot.

2. The method of claim 1, wherein each burst has an inherent property that determines the destination node of that burst.

3. The method of claim 2, wherein the network is an optical network, and the inherent property is wavelength.

4. The method of claim 3, further comprising transporting each scheduled burst from the origin node to the destination node.

5. The method of claim 4, wherein the transporting of bursts is carried out passively.

6. The method of claim 1, wherein at least one node pair is represented as a candidate for scheduling on a primary path from the pertinent origin node to the pertinent destination node, and further represented as a candidate for scheduling on a backup path between said nodes, said primary and backup paths being no more than partially coincident.

7. The method of claim 6, wherein the primary and backup pats are disjoint.

* * * * *

UNITED STATES PATENT AND TRADEMARK OFFICE
CERTIFICATE OF CORRECTION

PATENT NO.      : 7,283,552 B2                                    Page 1 of 1
APPLICATION NO. : 10/426389
DATED           : October 16, 2007
INVENTOR(S)     : K. Kumaran et al.

It is certified that error appears in the above-identified patent and that said Letters Patent is hereby corrected as shown below:

Column 7, line 51, delete "j" after the word 'and' and insert --i'--

Signed and Sealed this

Twenty Second Day of April, 2008

JON W. DUDAS
*Director of the United States Patent and Trademark Office*